United States Patent
Ma et al.

(10) Patent No.: US 7,233,625 B2
(45) Date of Patent: Jun. 19, 2007

(54) PREAMBLE DESIGN FOR MULTIPLE INPUT—MULTIPLE OUTPUT (MIMO), ORTHOGONAL FREQUENCY DIVISION MULTIPLEXING (OFDM) SYSTEM

(75) Inventors: Jianglei Ma, Ottawa (CA); Wen Tong, Ottawa (CA); Shiquan Wu, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 665 days.

(21) Appl. No.: 09/819,957

(22) Filed: Mar. 28, 2001

(65) Prior Publication Data

US 2002/0041635 A1    Apr. 11, 2002

Related U.S. Application Data

(63) Continuation-in-part of application No. 09/751,879, filed on Dec. 29, 2000.

(60) Provisional application No. 60/229,972, filed on Sep. 1, 2000.

(51) Int. Cl.
*H04L 27/28*     (2006.01)

(52) U.S. Cl. ............... 375/260; 375/267; 375/299; 375/347; 455/101; 455/112; 370/330; 370/465

(58) Field of Classification Search ............... 375/130, 375/146, 261, 260, 267, 298, 299, 347, 377; 455/25, 101, 103, 104, 112; 370/327, 330, 370/465, 477, 478, 482
See application file for complete search history.

(56) References Cited

U.S. PATENT DOCUMENTS

| | | | |
|---|---|---|---|
| 6,442,214 B1 * | 8/2002 | Boleskei et al. | 375/299 |
| 6,704,370 B1 * | 3/2004 | Chheda et al. | 375/299 |
| 6,731,668 B2 * | 5/2004 | Ketchum | 375/130 |
| 2002/0122381 A1 | 9/2002 | Wu et al. | 370/208 |

OTHER PUBLICATIONS

Jones, V.K.; Raleigh, Gregory G.; Channel Estimation For Wireless OFDM Systems; IEEE, Nov. 8, 1998, pp. 980-985.
Cimini, Leonard J. et al.; Clustered OFDM With Transmitter Diversity And Coding; IEEE; Nov. 18, 1996, pp. 703-707.
Daneshrad, Babak et al; Clustered-OFDM Transmitter Implementation; IEEE; 1996, pp. 1064-1068.
Matsumoto, Yoichi et al.; OFDM Subchannel Space-Combining Transmission Diversity; IEEE, 1998, pp. 137-141.

* cited by examiner

*Primary Examiner*—Dac V. Ha

(57) ABSTRACT

One or more preambles are inserted into frames of Orthogonal Frequency Multiplexing (OFDM)-Multiple Input, Multiple Output (MIMO) signals. The preamble is received by the antennas of a receiver, decoded and compared to known values to provide synchronization, framing, channels estimation, offsets and other corrections to the transmitted signal.

26 Claims, 7 Drawing Sheets

PREAMBLE DESIGN FOR MULTIPLE INPUT—MULTIPLE OUTPUT (MIMO), ORTHOGONAL FREQUENCY DIVISION MULTIPLEXING (OFDM) SYSTEM

RELATED APPLICATIONS

This application is a continuation-in-part of U.S. application Ser. No. 09/751,879, filed Dec. 29, 2000, which claims the priority of U.S. Provisional Application No. 60/229,972, filed Sep. 1, 2000.

FIELD OF THE INVENTION

The present invention is directed to the delivery of data via a wireless connection and, more particularly, to the accurate delivery of data at high rates via a wireless connection.

BACKGROUND OF THE INVENTION

The demand for services in which data is delivered via a wireless connection has grown in recent years and is expected to continue to grow. Included are applications in which data is delivered via cellular mobile telephony or other mobile telephony, personal communications systems (PCS) and digital or high definition television (HDTV). Though the demand for these services is growing, the channel bandwidth over which the data may be delivered is limited. Therefore, it is desirable to deliver data at high speeds over this limited bandwidth in an efficient, as well as cost effective, manner.

A known approach for efficiently delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as sub-carrier frequencies ("sub-carriers"). The frequency spectra of the sub-carriers overlap so that the spacing between them is minimized. The sub-carriers are also orthogonal to each other so that they are statistically independent and do not create crosstalk or otherwise interfere with each other. As a result, the channel bandwidth is used much more efficiently than in conventional single carrier transmission schemes such as AM/FM (amplitude or frequency modulation), in which only one signal at a time is sent using only one radio frequency, or frequency division multiplexing (FDM), in which portions of the channel bandwidth are not used so that the sub-carrier frequencies are separated and isolated to avoid inter-carrier interference (ICI).

Further, each block of data is converted into parallel form and mapped into each subcarrier as frequency domain symbols. To get time domain signals for transmission, an inverse discrete Fourier transform or its fast version, IFFT, is applied to the symbols. The symbol duration is much longer than the length of the channel impulse response so that inter-symbol interference is avoided by inserting a cyclic prefix for each OFDM symbol. Thus, OFDM is much less susceptible to data loss caused by multipath fading than other known techniques for data transmission. Also, the coding of data onto the OFDM sub-carriers takes advantage of frequency diversity to mitigate loss from frequency-selective fading when forward error correction (FEC) is applied.

In addition to having greater spectral efficiency, i.e. more bps/Hz, than conventional transmission schemes, the OFDM spectral efficiency is further enhanced because the spectrum can be made to look like a rectangular window so that all frequencies are similarly utilized. Moreover, OFDM is less sensitive to timing errors because the timing errors are translated to a phase offset in the frequency domain.

Another approach to providing more efficient use of the channel bandwidth is to transmit the data using a base station having multiple antennas and then receive the transmitted data using a remote station having multiple receiving antennas, referred to as Multiple Input-Multiple Output (MIMO). The data may be transmitted such there is spatial diversity between the signals transmitted by the respective antennas, thereby increasing the data capacity by increasing the number of antennas. Alternatively, the data is transmitted such that there is temporal diversity between the signals transmitted by the respective antennas, thereby reducing signal fading.

Presently, MIMO systems either are designed to transmit signals having spatial diversity or are designed to transmit signals having temporal diversity. It is therefore desirable to provide a common system that can deliver signals with either spatial diversity or temporal diversity depending on the transmission environment.

It is further desirable to provide a system that has the advantages of both an OFDM system as well as those of a MIMO system. Such a system would transmit the OFDM symbols over a plurality of channels with either spatial diversity or temporal diversity between the symbols. However, when the signals are received at the remote station, the framing and timing of the received signals and the frequency and sampling clock offsets must be determined so that the information contained in the received signals may be recovered. Further, the signals may be distorted because of transmitter imperfections as well as because of environmental effects and interference which change the frequencies of the channels and may also increase the bit error rate (BER). Additionally, the gain of the received signals must be controlled.

Accordingly, it is advantageous to provide a system that can efficiently transfer data from a transmitter to a receiver over multiple channels.

SUMMARY OF THE INVENTION

The present invention provides a preamble that is inserted into a signal frame and which corresponds to a respective transmitter antenna. The preamble is matched to known values by a respective receiver to decode the signals and permit multiple signals to be transferred from the transmitter to the receiver.

In accordance with an aspect of the invention, a preamble portion of a data signal is configured for transmission over a plurality of sub-carriers by at least two antennas of a transmitter device. A respective pseudo-noise (PN) code is assigned to each of the at least two antennas. Each of the plurality of sub-carriers is assigned to a respective one of the at least two antennas. Each of the plurality of sub-carriers is modulated as a function of the respective pseudo-noise (PN) code that is assigned to a same one of the at least two antennas as the each of the plurality of sub-carriers such that a plurality of modulated sub-carriers are obtained that are each assigned to a respective one of the at least two antennas. Each of the plurality of modulated sub-carriers is delivered to its assigned transmitter. Each the plurality of modulated sub-carriers using its assigned transmitter is transmitted at substantially a same time.

According to another aspect of the invention, a preamble portion of a data signal is configured for transmission over a plurality of sub-carriers by at least two transmitter devices each having at least two antennas. A respective pseudo-noise (PN) code is assigned to each of the at least two antennas. Each of the plurality of sub-carriers is assigned to a respective one of the at least two transmitter devices. Each of the plurality of sub-carriers is modulated as a function of the respective pseudo-noise (PN) code that is assigned to a same one of the at least two transmitter devices to which the each of the plurality of sub-carriers is assigned such that a plurality of modulated sub-carriers are obtained that are each assigned to a respective one of the at least transmitter devices. Each of the plurality of modulated sub-carriers using each of the at least two antennas of its assigned transmitter device at substantially a same time.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The present invention provides an Orthogonal Frequency Divisional Multiplexing (OFDM) signal that is delivered using Multiple-Input and Multiple-Output (MIMO) transmitter and receiver antennas. In a conventional OFDM system, a block of data is represented by a frequency domain signal vector S that may be comprised of real or complex values. The vector S may be comprised of, for example, 1024 elements, namely S=(s0, s1, . . . ,s1024). Each element of the frequency domain signal vector S is used to modulate a respective sub-carrier frequency of the carrier signal to obtain OFDM symbols. The frequency domain signal vector S is then converted into the time domain, such as using a inverse fast Fourier transform (IFFT), to obtain a time domain vector V=IFFT(S)=(v0, v1,. . . ,v1024). A cyclic prefix, comprised of the last elements of the vector V, is then inserted at the front of the vector V to obtain vector V'=(v1000, v1001, . . . , v1024, v0, v1, . . . , v1024). The elements of the V' are then transmitted serially by a single transmitter antenna over the single channel to a receiver having a single receiver antenna.

In an OFDM-MIMO system of the invention, by contrast, the OFDM symbols are transmitted in the time domain using multiple antennas to concurrently transmit the symbols over the same sub-carriers to multiple receiver antennas. However, when the signals are detected by the multiple antenna, they may be distorted and must also be synchronized and framed properly to avoid errors.

Thus, the invention provides one or more preambles which are is inserted between the OFDM data symbols within OFDM frames in the time domain. The preamble includes training symbols which include a training sequence for different antennas, also known as pilot symbols.

Figure 1:
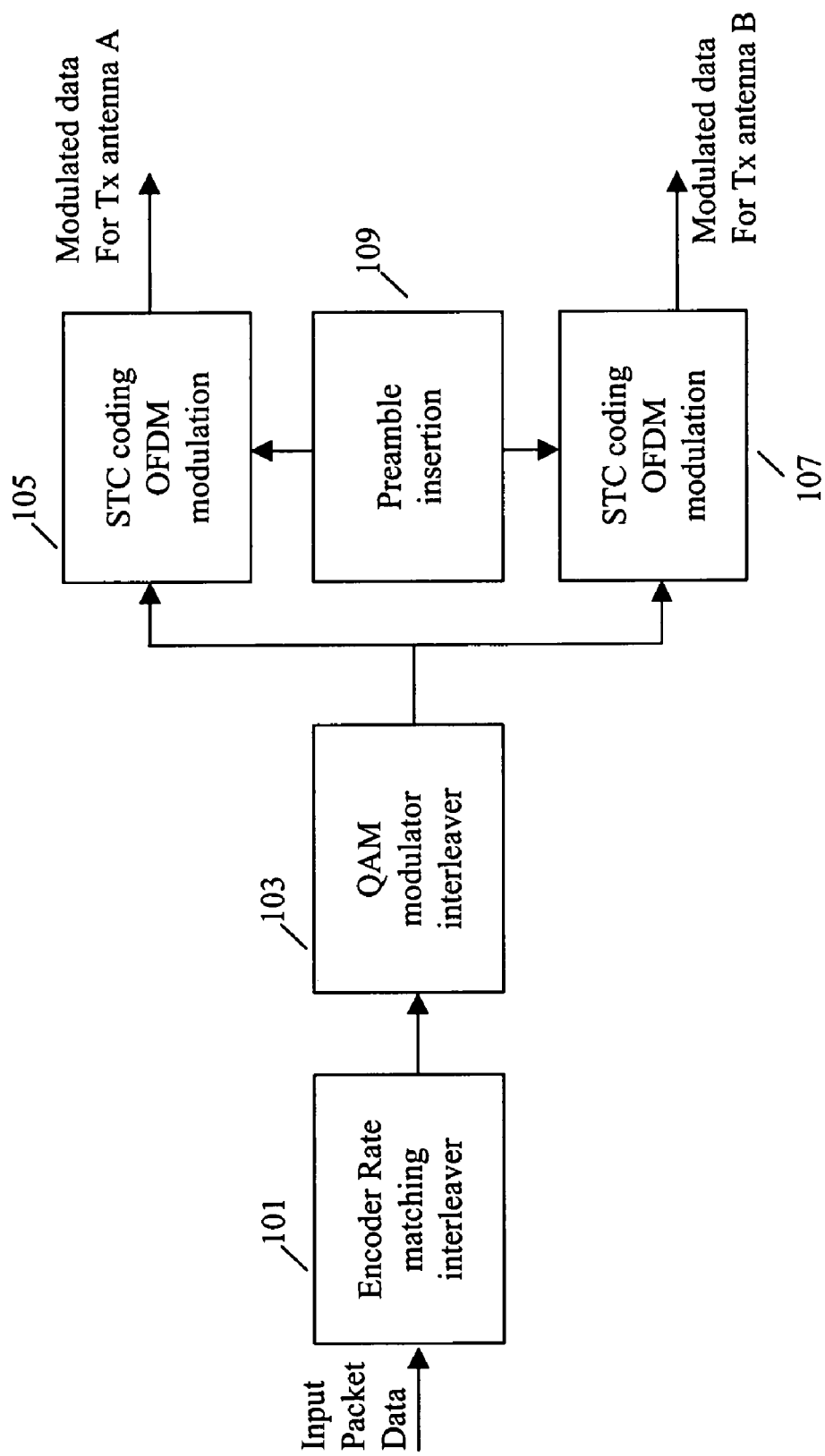
FIG. 1 is a block diagram showing an example of transmitter arrangement for generating OFDM-MIMO signals that include preambles according to the invention.

FIG. 1 shows an arrangement an OFDM transmitter employed by the invention. An encoder and rate matching interleaver 101 receives a stream of data bits and divides the stream of data bits into segments of B bits each, such as segments of 1024 bits. A block and/or a convolutional coding scheme is then carried out on the segments of B bits to introduce error correcting and/or error-detecting redundancy. The segments of B bits are then respectively subdivided into 2N sub-segments of m bits each, where m typically has a value of from two to six.

The encoder and rate matching interleaver 101 then delivers the sub-segments of data to a quadrature amplitude modulation (QAM) modulator and interleaver 103 which maps the sub-segments onto corresponding complex-valued points in a $2^m$-ary constellation. A corresponding complex-valued $2^m$-ary QAM sub-symbol, $c_k=a_k+jb_k$, that represent a discrete value of phase and amplitude, where $-N \leq k \leq N$, is assigned to represent each of the sub-segments such that a sequence of frequency-domain sub-symbols is generated. The QAM modulator and interleaver 103 also assigns the value $c_o=0$ to the zero-frequency sub-carrier and interleaves any additional zeroes that may be required for later interpolation into the sequence of frequency-domain sub-symbols.

The QAM modulator and interleaver 103 then delivers the sequence of frequency-domain sub-symbols to one of space time coding (STC) and OFDM modulation circuits 105 and 107 which employs an inverse fast Fourier transform (IFFT) to modulate the phase and amplitude of the sub-carriers and also space time code the sub-carriers to incorporate either spatial diversity or temporal diversity between the sub-carriers. Each of the complex-valued, frequency-domain sub-symbols $c_k$ is used to modulate the phase and amplitude of a corresponding one of 2N+1 sub-carrier frequencies over a symbol interval $T_s$. The sub-carriers are each represented by change value $e^{-2\pi j f_k}$ and have baseband frequencies of $f_k=k/T_s$, where k is the frequency and is an integer in the range $-N \leq k \leq N$. A plurality of digital time-domain OFDM symbols of duration $T_s$ are thus generated according to the relation:

$$u(t) = \sum_{k=-N}^{N} c_k \exp(-2\pi i f^k),$$

where $0 \leq t \leq T_s$.

The modulated sub-carriers are each modulated according to a sinc x=(sin x)/x function in the frequency domain, with a spacing of $1/T_s$ between the primary peaks of the sub-carriers, so that the primary peak of a respective sub-carrier coincides with a null the adjacent sub-carriers. Thus, the modulated sub-carriers are orthogonal to one another though their spectra overlap.

A preamble insertion circuit 109 stores and periodically inserts at least one preamble into the modulated sub-carriers respectively generated by the STC and OFDM modulation circuits 105 and 107 according to the invention. The STC and OFDM modulation circuits 105 and 107 then deliver the modulated sub-carriers and the preambles in the time domain to their respective antennas (not shown) for transmission.

Preferably, the pilot symbols of the preamble are initially generated in the frequency domain by modulating frequency domain sub-carriers using a psuedo-noise (PN) code that is unique to each transmitter antenna. Then, the frequency domain pilot symbol sequence is converted to the time domain using an inverse fast Fourier transform (IFFT). The time domain pilot symbols are then stored in a memory in the pilot insertion circuit 109 and are then periodically inserted into the time domain OFDM-MIMO signal, such as at the beginning of a frame.

Figure 2:
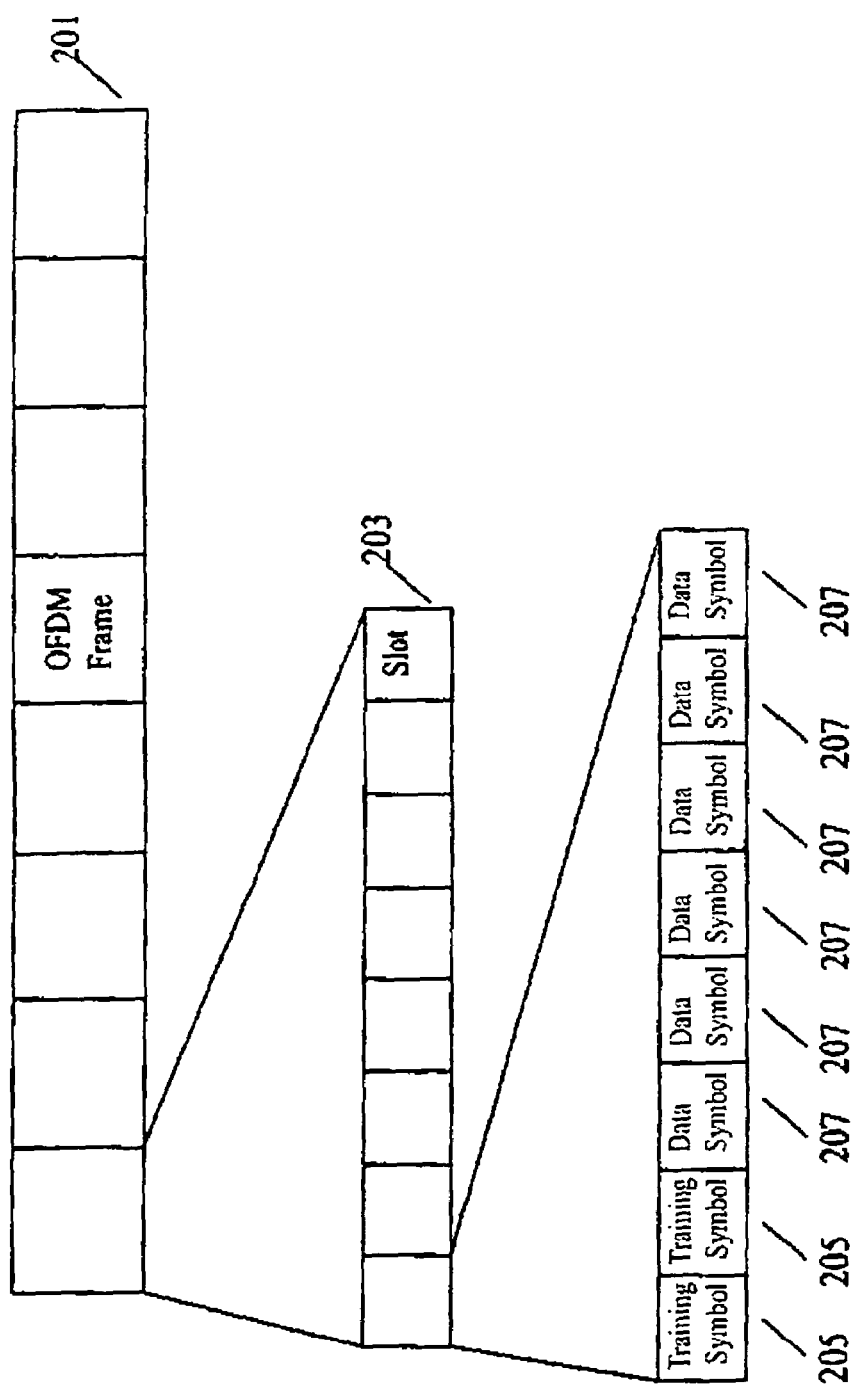
FIG. 2 is a diagram showing an example of a frame, slot and symbol structure for signals of the invention.

FIG. 2 shows an example of a structure of the transmitted OFDM-MIMO signal in the time domain. The signal is formatted as a plurality of frames 201. Each frame includes plural slots 203. The first slot of each frame includes a preamble that is located at the beginning of the slot. The preamble includes two training symbols 205 and plural symbols 207.

Figure 3:
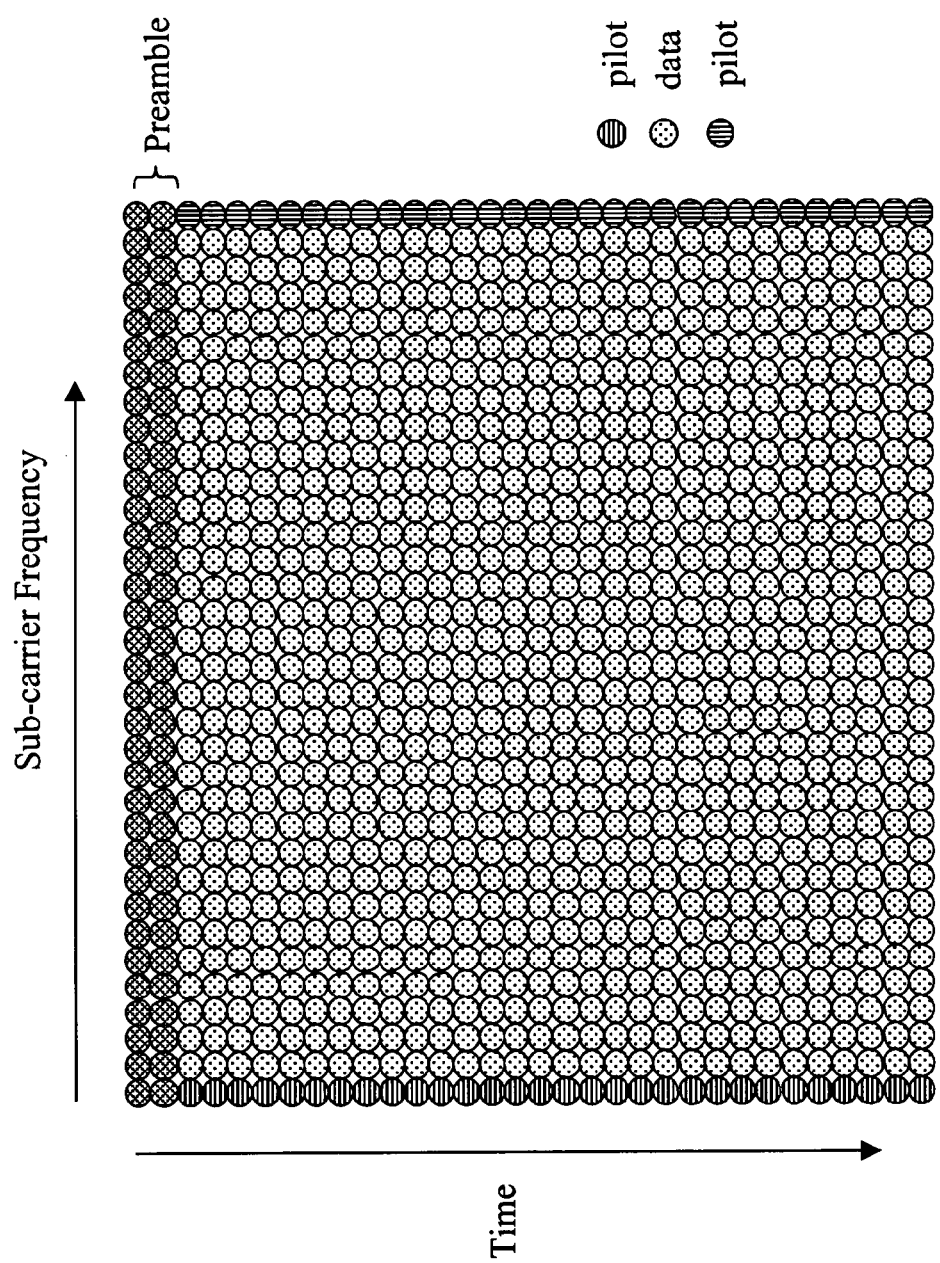
FIG. 3 is a diagram showing an arrangement of preamble, pilot and data symbols according to sub-carrier frequency and time in accordance with the invention.

FIG. 3 shows the transmitted symbols arranged according to increasing time and increasing sub-carrier frequency. In the time domain, the first two symbols of a frame are preamble symbols, as described above. Thereafter, data symbols or pilot symbols are transmitted, depending on the sub-carrier frequency, until the next preamble symbols are transmitted.

Figure 4:
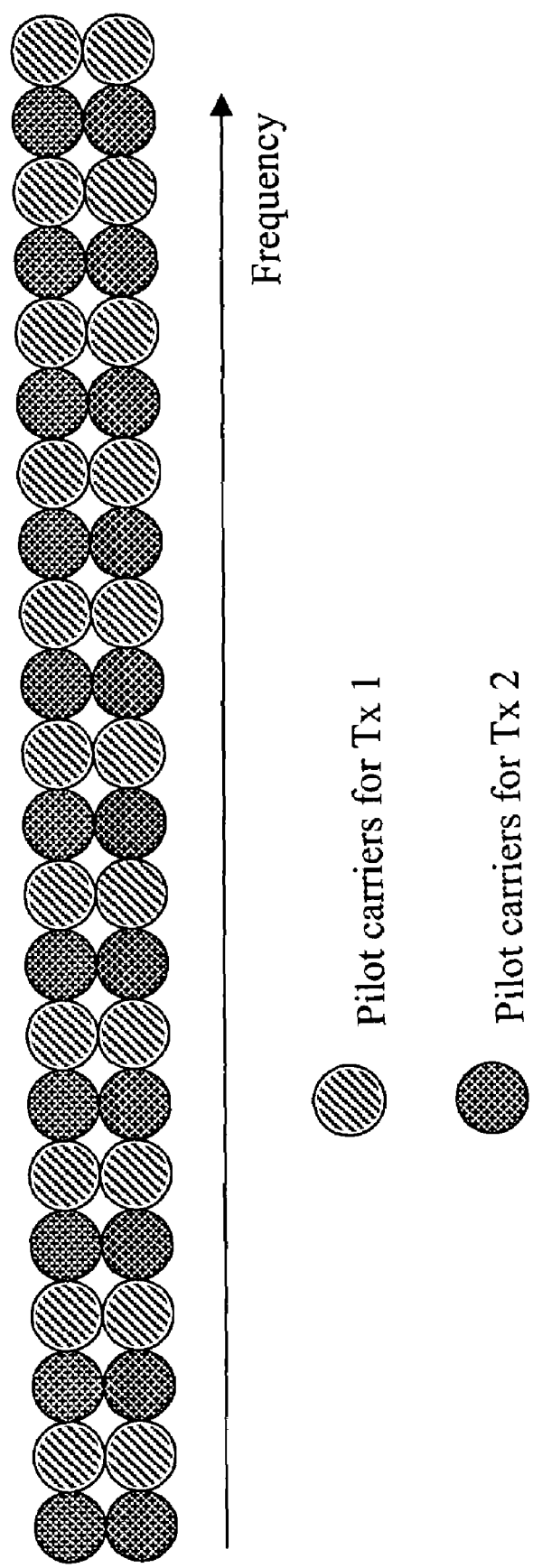
FIG. 4 is a diagram showing an example of an arrangement in the frequency domain of pilot carriers transmitted by a pair of transmitter antennas according to the invention.

FIG. 4 illustrates, in greater detail, an example of a preamble shown in FIG. 3, referred to as Preamble 1. The preamble is broadcast by a single base station having at least two transmitter antennas. Each transmitter antenna transmits respective pairs of identical training symbols, also known as pilot carrier symbols, at a given sub-carrier frequency.

The sub-carrier frequencies are divided into groups which are each assigned to a respective transmitter antenna. For example, FIG. 3 shows two transmitter antennas where, for example, the even numbered sub-carriers are assigned to Antenna Tx1 and the odd numbered sub-carriers are assigned to Antenna Tx2. The pilot symbols for each antenna are orthogonal in the frequency domain in an interlaced transmission patterns, and the pilot symbols are superimposed in the time domain.

A unique psuedo-noise (PN) code is assigned to each transmitter antenna to define the pilot symbols used to modulate the sub-carrier frequencies. The values of the pilot symbols that are transmitted are known to the receiver and may be used by the receiver to determine the framing of the transmitted signal, to determine the timing of the transmitted signal, to estimate the frequency and timing clock offsets of the receiver, to estimate the distortion in the transmitted sub-carrier channels, and to estimate the carrier-to-interference (C/I) ratio of the transmitted signals.

When more than one base transceiver station (BTS) transmits to a receiver, another example of a preamble, referred to as Preamble 2, may be used, such as for fast cell switching applications. Two training symbols are used. However, the sub-carrier frequencies are divided among the BTSs, and each BTS uses a respective PN code to modulate its assigned sub-carrier frequencies. The sub-carrier frequencies assigned to particular BTS, as well as the PN code assigned to each BTS, are known to the receiver and may be used to provide co-channel interference cancellation between the BTSs, may be used to estimate the sub-carrier channels used by adjacent BTSs, and may be used as pilot symbols to track the sub-carrier channels.

Figure 5:
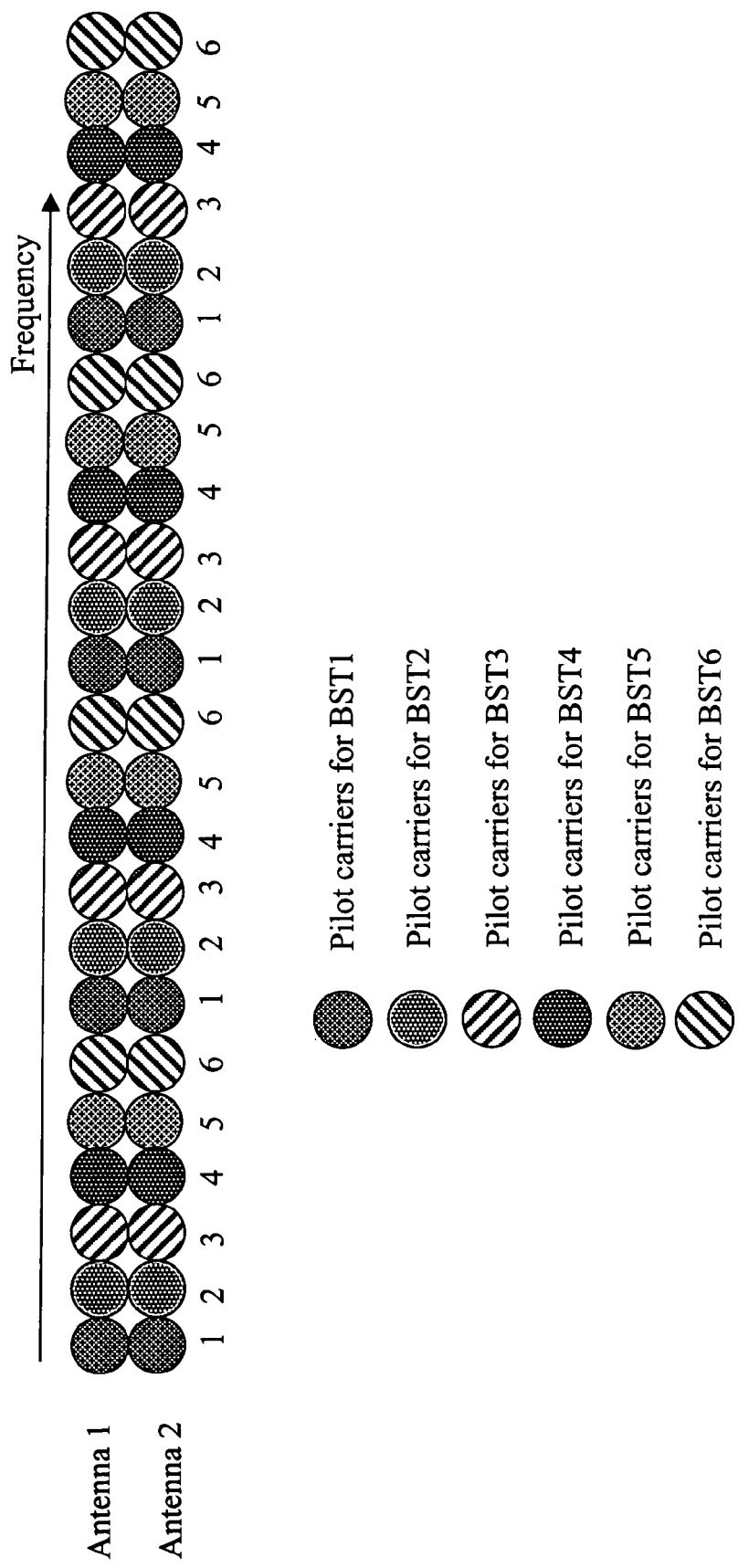
FIG. 5 is a diagram showing an example of an arrangement in the frequency domain of pilot carriers transmitted by plural base stations according to the invention.

FIG. 5 illustrates and example of Preamble 2 in which 6 BTSs each transmit using two respective antennas. The two training symbols are assigned to Antenna Tx1 and Antenna Tx2, respectively. The sub-carrier frequencies are divided into 6 groups, each as signed to a BTSs.

Figure 6:
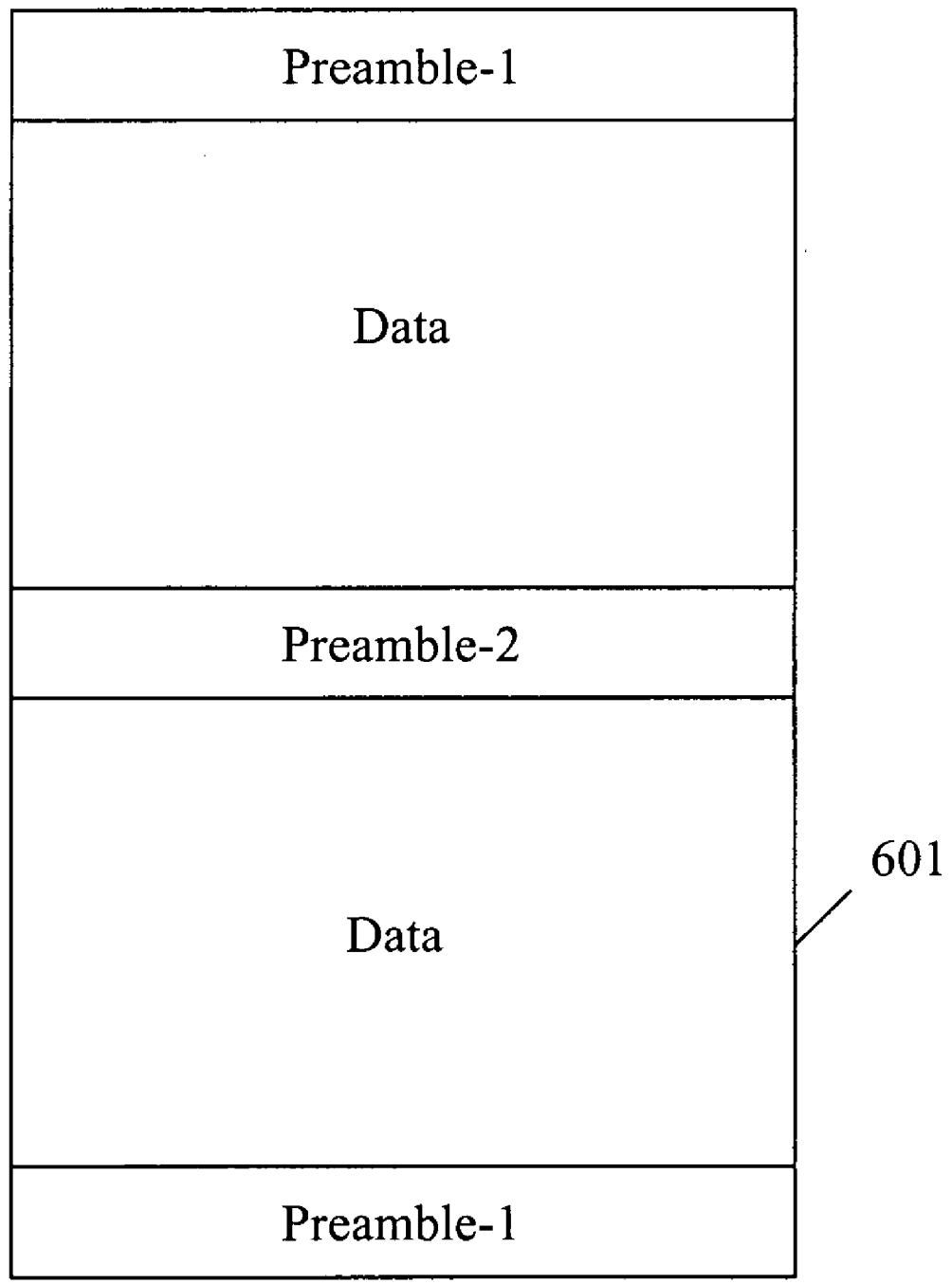
FIG. 6 is a diagram showing an arrangement of preambles and data within one or more frames in accordance with the invention.

FIG. 6 illustrates an example of the insertion of preambles into one or more frames 601. A preamble, shown here as Preamble 1, is inserted at the beginning of the frame. Then, depending on the length of the frame and the channel conditions, additional preambles may be inserted at locations within the frame. As an example, Preamble 2 is inserted in the middle of the frame. A further preamble may be inserted at the end of the frame or at the beginning of the next frame.

Figure 7:
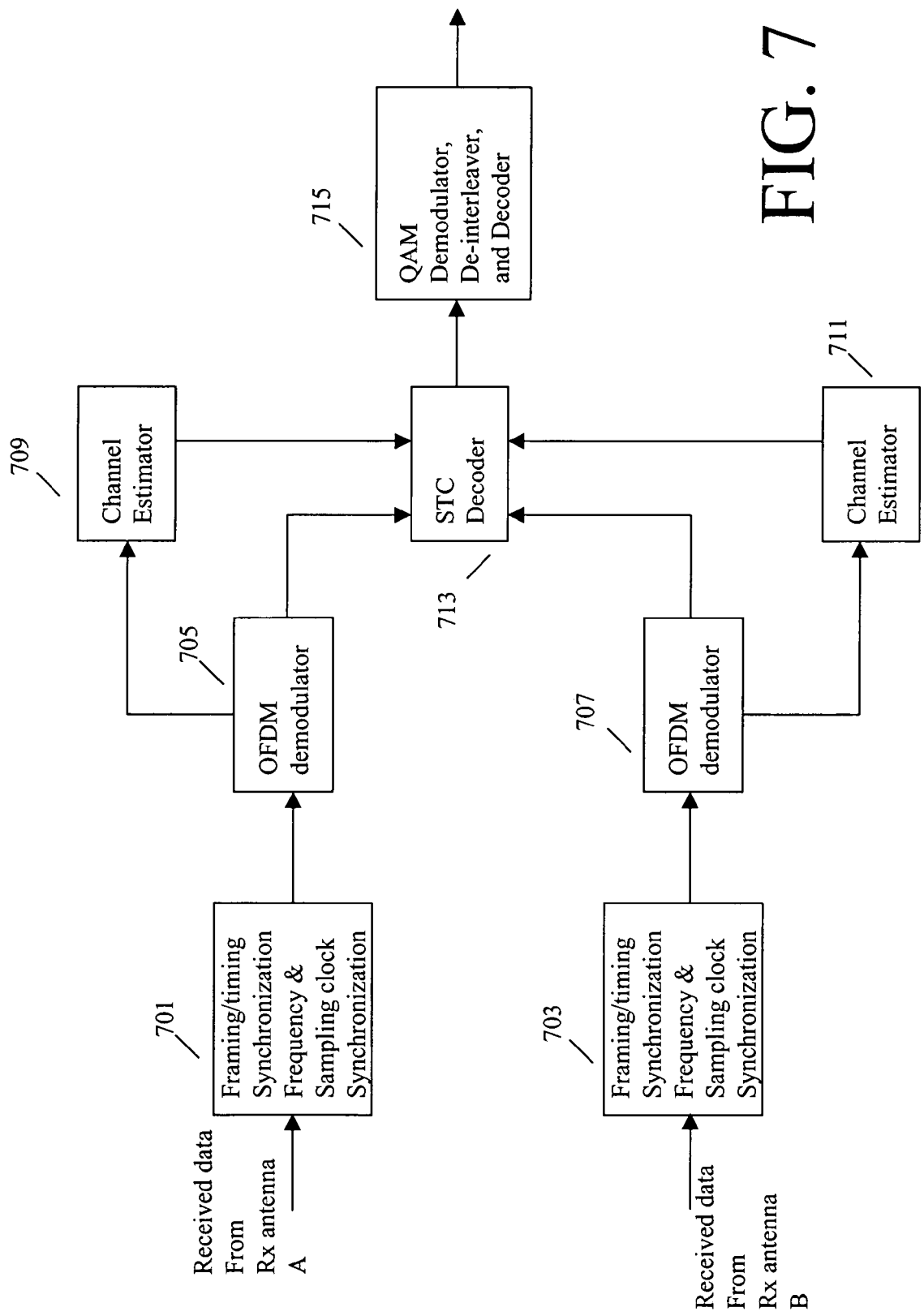
FIG. 7 is a block diagram showing an example of a receiver arrangement for receiving and decoding OFDM-MIMO signals that include preambles according to the invention.

FIG. 7 is an example of a receiver that receives and decodes the preambles of the present invention. The receiver may be an Internet network terminal, cellular or wireless telephone, or other device that is able to receive OFDM-MIMO signals.

RF signals received by receiver antennas A and B (not shown) are delivered to respective circuits 701, 703 which convert the analog OFDM signals into digital signals and use the preamble of the signal to synchronize the signal and determine the frame boundaries of the transmitted data, such as by using sliding correlation. The framed data is then converted into vector form.

To obtain better framing synchronization, a fine synchronization stage is used by checking the correlation between received signals with known signals that are stored in the OFDM receiver memory. The orthogonal property of PN pilots in the training symbols is utilized to separate MIMO channels and perform the fine synchronization. The synchronization may be performed either in the time domain or in the frequency domain. The MIMO system makes the fine synchronization more robust to multi-path fading due to the separation of the MIMO channel correlators.

The synchronization operation is described in greater detail in U.S. application Ser. No. 09/751,881, titled "Synchronization in a Multiple-input/multiple-output (MIMO) Orthogonal Frequency Division Multiplexing (OFDM) System For Wireless Applications", filed Dec. 29, 2000 by the applicants of the present application, and incorporated herein by reference.

After timing synchronization, the FFT window is determined, and the received OFDM signals are framed and are transferred into the frequency domain. The pilot channel can be used to estimate the frequency and sampling clock. The performance can be improved by averaging the results obtained from the different MIMO channels.

The digital signals are also corrected for any differences between the oscillation frequency of the local oscillator of the transmitter system and the oscillation frequency of the local oscillator of the receiver system. A correction signal is used in generating the data vectors.

The circuits 701 and 703 then deliver the data vectors to their demodulators 705, 707 which removes unneeded cyclical extensions in the data vector and performs a discrete 0Fourier transform (DFT) or a Fast Fourier Transform (FFT) that demodulates the data vectors to recover the original sequences of frequency domain sub-symbols. The demodulators 705, 707 then deliver the frequency domain sub-symbols to a STC decoder 713 which decodes the sub-symbols. The STC decoder also uses the preamble portion of the sub-symbols to correct for co-channel interference.

The demodulators 705, 707 also deliver the preamble portion of the frequency domain sub-symbols to their respective channel estimators 709, 711 which use the detected sub-symbols and the known values of the sub-symbols to estimate the values of channel responses vectors that are delivered to the STC decoder 713 to compensate for distortions in the received signal.

The STC decoder 713 then delivers the decoded sub-symbols to circuit 715 which performs a QAM demodulation and de-interleaving, and further decodes the sub-symbols to obtain the original raw bit stream.

The operation of the MIMO-OFDM receiver system and the channel estimation are described in greater detail in U.S. application Ser. Nos. 09/750,804 titled "Adaptive Time Diversity and Spatial Diversity for OFDM and 09/751,166 titled "Channel Estimation for a MIMO OFDM System", both filed Dec. 29, 2000 and incorporated herein by reference.

Although the present invention has been described in relation to particular embodiments thereof, many other variations and modifications and other uses may become apparent to those skilled in the art. It is preferred, therefore, that the present invention be limited not by this specific disclosure herein, but only by the appended claims.

What is claimed is:

1. A method of configuring a preamble portion of a data signal for transmission over a plurality of sub-carriers by at least two antennas of a transmitter device, said method comprising:
   assigning a respective pseudo-noise (PN) code to each of said at least two antennas;
   assigning each of said plurality of sub-carriers to a respective one of said at least two antennas;
   modulating each of said plurality of sub-carriers as a function of said respective pseudo-noise (PN) code that is assigned to a same one of said at least two antennas as said each of said plurality of sub-carriers such that a plurality of modulated sub-carriers are obtained that are each assigned to a respective one of said at least two antennas;
   delivering each of said plurality of modulated sub-carriers to its assigned transmitter; and
   transmitting, at substantially a same time, each said plurality of modulated sub-carriers using its assigned transmitter.

2. The method of claim 1 wherein said data signal comprises an Orthogonal Frequency Division Multiplexing (OFDM) signal.

3. The method of claim 1 wherein said data signal is comprised of a plurality of frames, each of said plurality of frames being comprised of a plurality of time slots, each of said plurality of time slots including a plurality of symbols, and said method further comprises: inserting said each of said plurality of modulated sub-carriers into at least a first two of said plurality of symbols within a first one of said plurality of time slots prior to delivering said plurality of modulated sub-caters to its assigned antenna.

4. The method of claim 3 further comprising: inserting said each of said plurality of modulated sub-carriers into at least a first two of said plurality of symbols within a further one of said plurality of time slots prior to delivering said plurality of modulated sub-carriers to its assigned antenna.

5. A method of configuring a preamble portion of a data signal for transmission over a plurality of sub-carriers by at least two transmitter devices each having at least two antennas, said method comprising:
   assigning a respective pseudo-noise (PN) code to each or said at least two antennas;
   assigning each of said plurality of sub-carriers to a respective one of said at least two transmitter devices;
   modulating each of said plurality of sub-carriers as a function of said respective pseudo-noise (PN) code that is assigned to a same one of said at least two transmitter devices to which said each of said plurality of sub-carriers is assigned such that a plurality of modulated sub-carriers are obtained that arc each assigned to a respective one of said at least transmitter two devices; and
   transmitting, at substantially a same time, each of said plurality of modulated sub-carriers using each of said at least two antennas of its assigned transmitter device.

6. The method of claim 5 wherein said signal comprises an Orthogonal Frequency Division Multiplexing (OFDM) signal.

7. The method of claim 5 wherein said data signal is comprised of a plurality of frames, each of said plurality of frames being comprised of a plurality of time slots, each of said plurality of time slots including a plurality of symbols, and said method further comprises: inserting said each of said plurality of modulated sub-carriers into at least a first two of said plurality of symbols within a first one of said plurality of time slots prior to delivering said plurality of modulated sub-carriers to its assigned transmitter device.

8. The method of claim 7 further comprising: inserting said each of said plurality of modulated sub-carriers into at least a first two of said plurality of symbols within a further one of said plurality of time slots prior to delivering said plurality of modulated sub-carriers to its assigned transmitter device.

9. An apparatus for configuring a preamble portion of a data signal for transmission over a plurality sub-carriers by at least two antennas of a transmitter device, said apparatus comprising:
   a preamble insertion circuit configured to:
   assign a respective pseudo-noise (PN) code to each of said at least two antennas;
   assign each of said plurality of sub-carriers to a respective one of said at least two antennas; and
   modulate each of said plurality of sub-carriers as a function of said respective pseudo-noise (PN) code that is assigned to a same one of said at least two antennas as said each of said plurality of sub-carriers such that a plurality of modulated sub-carriers are obtained that are each assigned to a respective one of said at least two antennas; and
   a coding circuit configured to deliver each of said plurality of modulated sub- carriers to its assigned transmitter;
   said transmitter antenna being configured to transmit, at substantially a same time, each said plurality of modulated sub-carriers using its assigned transmitter.

10. The apparatus of claim 9 wherein said data signal comprises an Orthogonal Frequency Division Multiplexing (OFDM) signal.

11. The apparatus of claim 9 wherein said data signal is comprised of a plurality of frames, each of said frames being comprised of a plurality of time slots, each of said time slots including a plurality of symbols, and wherein said coding circuit is further configured to: insert said each of said plurality of modulated sub-caters into at least a first two of said plurality of symbols within a first one of said plurality of time slots prior to delivering said plurality of modulated sub-carriers to its assigned antenna.

12. The method of claim 11 wherein said coding circuit is further configured to: insert said each of said plurality of modulated sub-carriers into at least a first two of said plurality of symbols within a further one of said plurality of time slots prior to delivering said plurality of modulated sub-carriers to its assigned antenna.

13. An apparatus for configuring a preamble portion of a data signal for transmission over a plurality of sub-carriers by at least two transmitter devices each having at least two antennas, said apparatus comprising:
a preamble insertion circuit configured to:
assign a respective pseudo-noise (PN) code to each of said at least two antennas;
assign each of said plurality of sub-carriers to a respective one of said at least two transmitter devices; and
modulate each of said plurality of sub-carriers as a function of said respective pseudo-noise (PN) code that is assigned to a same one of said at least two transmitter devices to which said each of said plurality of sub-criers is assigned such that a plurality of modulated sub-carriers are obtained tat are each assigned to a respective one of said at least two transmitter devices;
said at least two antennas of said at least two transmitter devices being configured to transmit, at substantially a same time, each of said plurality of modulated sub-carriers using each of said at least two antennas of its assigned transmitter device.

14. The apparatus of claim 13 wherein said signal comprises an Orthogonal Frequency Division Multiplexing (OFDM) signal.

15. The apparatus of claim 13 wherein said data signal is comprised of a plurality of frames, each of said plurality of frames being comprised at a plurality of time slots, each of said plurality of time slots including a plurality of symbols, and wherein said coding circuit is further configured to: insert said each of said plurality of modulated sub-carriers into at least a first two of said plurality of symbols within a first one of said plurality of time slots prior to delivering said plurality of modulated sub-carriers to its assigned transmitter device.

16. The apparatus of claim 15 wherein said coding circuit is further configured to: insert said each of said plurality of modulated sub-carriers into at least a first two of said plurality of symbols within a further one of said plurality of time slots prior to delivering said plurality of modulated sub-caters to its assigned transmitter device.

17. An apparatus for configuring a preamble portion of a data signal for transmission over a plurality of sub-carriers by at least two antennas of a transmitter device, said apparatus comprising:
means for assigning a respective pseudo-noise (PN) code to each of said at least two antennas;
means for assigning each of said plurality of sub-carriers to a respective one of said at least two antennas;
means for modulating each of said plurality of sub-carriers as a function of said respective pseudo-noise (PN) code that is assigned to a same one of said at least two antennas as said each of said plurality of sub-carriers such that a plurality of modulated sub-carriers are obtained that are each assigned to a respective one of said at least two antennas;
means for delivering each of said plurality of modulated sub-carriers to its assigned transmitter; and
means for transmitting, at substantially a same time, each said plurality of modulated sub-carriers using its assigned transmitter.

18. An apparatus for configuring a preamble portion of a data signal for transmission over a plurality of sub-carriers by at least two transmitter devices each having at least two antennas, said apparatus comprising:
means for assigning a respective pseudo-noise (PN) code to each of said at least two antennas;
means for assigning each of said plurality of sub-carriers to a respective one of said at least two transmitter devices;
means for modulating each of said plurality of sub-carriers as a function of said respective pseudo-noise (PN) code that is assigned to a same one of said at least two transmitter devices to which said each of said plurality of sub-carriers is assigned such that a plurality of modulated sub-carriers are obtained that arc each assigned to a respective one of said at least two transmitter devices; and
means for transmitting, at substantially a same time, each of said plurality of modulated sub-carriers using each of said at least two antennas of its assigned transmitter device.

19. A readable medium comprising:
instructions for configuring a preamble portion of a data signal for transmission over a plurality of sub-carriers by at least two antennas of a transmitter device, said instructions comprising:
instructions for assigning a respective pseudo-noise (PN) code to each of said at least two antennas;
instructions for assigning each of said plurality of sub-carriers to a respective one of said at least two antennas;
instructions for modulating each of said plurality of sub-carriers as a function of said respective pseudo-noise (PN) code that is assigned to a same one of said at least two antennas as said each of said plurality of sub-carriers such tat a plurality of modulated sub-carriers are obtained that are each assigned to a respective one of said at least two antennas;
instructions for delivering each of said plurality of modulated sub-carriers to its assigned transmitter; and
instructions for transmitting, at substantially a same time, each said plurality of modulated sub-carriers using its assigned transmitter.

20. The medium of claim 19 wherein said data signal comprises an Orthogonal Frequency Division Multiplexing (OFDM) signal.

21. The medium of claim 19 wherein said data signal is comprised of a plurality of frames, each of said plurality frames being comprised of a plurality of time slots, each of said plurality of time slots including a plurality of symbols, and further comprising: instructions for inserting said each of said plurality of modulated sub-carriers into at least a first two of said plurality of symbols within a first one of said plurality of time slots prior to delivering said plurality of modulated sub-carriers to its assigned antenna.

22. The medium of claim 21 further comprising: instructions for inserting said each of said plurality of modulated sub-carriers into at least a first two of said plurality of symbols within a further one of said plurality of time slots prior to delivering said plurality of modulated sub-carriers to its assigned antenna.

23. A readable medium comprising:
instructions for configuring a preamble portion of a data signal for transmission over a plurality of sub-carriers by at least two transmitter devices each having at least two antennas, said instructions for comprising:
instructions for assigning a respective pseudo-noise (PN) code to each of said at least two antennas;
instructions for assigning each of said plurality of sub-carriers to a respective one of said at least two transmitter devices;
instructions for modulating each of said plurality of sub-carriers as a function of said respective pseudo-noise (PN) code that is assigned to a same one of said at least two transmitter devices to which said each of said plurality of sub-carriers is assigned such that a plurality of modulated sub-carriers are obtained that are each assigned to a respective one of said at least transmitter devices; and
instructions for transmitting, at substantially a same time, each of said plurality of modulated sub-carriers using each of said at least two antennas of its assigned transmitter device.

24. The medium of claim 23 wherein said signal comprises an Orthogonal Frequency Division Multiplexing (OFDM) signal.

25. The medium of claim 23 wherein said data signal is comprised of a plurality of frames, each of said plurality of frames being comprised of a plurality of time slots, each of said plurality of time slots including a plurality of symbols, and further comprising: instructions for inserting said each of said plurality of modulated sub-carriers into at least a first two of said plurality of symbols within a first one of said plurality of time slots prior to delivering said plurality of modulated sub-carriers to its assigned transmitter device.

26. The medium of claim 25 further comprising: instructions for inserting said each of said plurality of modulated sub-carriers into at least a first two of said plurality of symbols within a further one of said plurality of time slots prior to delivering said plurality of modulated sub-carriers to its assigned transmitter device.

* * * * *

UNITED STATES PATENT AND TRADEMARK OFFICE
CERTIFICATE OF CORRECTION

PATENT NO. : 7,233,625 B2  Page 1 of 1
APPLICATION NO. : 09/819957
DATED : June 19, 2007
INVENTOR(S) : Jianglei Ma et al.

It is certified that error appears in the above-identified patent and that said Letters Patent is hereby corrected as shown below:

| Column/Line Number | | Error |
|---|---|---|
| Column 4, line 40 | | Insert space missing between "O" and "to" |
| Column 7, line 7 | | delete "O" should not be there |
| Column 7, line 64 | Claim 3 | "sub-caters" should be --sub-carriers-- |
| Column 8, line 7 | Claim 5 | "or" should be --are-- |
| Column 8, line 16 | Claim 5 | "arc" should be --are-- |
| Column 8, line 57 | Claim 9 | delete extra space between "sub-" and "carriers" |
| Column 9, line 3 | Claim 11 | "sub-caters" should be --sub-carriers-- |
| Column 9, lines 25-26 | Claim 13 | "sub-criers" should be --sub-carriers" |
| Column 9, line 27 | Claim 13 | "tat" should be --that-- |
| Column 9, line 39 | Claim 15 | "at" should be --of-- |
| Column 9, line 52 | Claim 15 | "sub-caters" should be --sub-carriers-- |
| Column 10, line 20 | Claim 18 | "arc" should be --are-- |
| Column 10, line 40 | Claim 19 | "tat" should be --that-- |

Signed and Sealed this

Fifth Day of August, 2008

JON W. DUDAS
*Director of the United States Patent and Trademark Office*